(12) United States Patent
Van Nieuwenhove et al.

(10) Patent No.: US 11,863,734 B2
(45) Date of Patent: *Jan. 2, 2024

(54) TIME-OF-FLIGHT CAMERA SYSTEM

(71) Applicant: Sony Depthsensing Solutions SA/NV, Brussels (BE)

(72) Inventors: Daniel Van Nieuwenhove, Hofstade (BE); Julien Thollot, Woluwe-Saint-Lambert (BE)

(73) Assignee: Sony Depthsensing Solutions SA/NV, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,863

(22) Filed: Nov. 9, 2021

(65) Prior Publication Data

US 2022/0070436 A1   Mar. 3, 2022

Related U.S. Application Data

(60) Continuation of application No. 16/843,346, filed on Apr. 8, 2020, now Pat. No. 11,172,186, which is a (Continued)

(30) Foreign Application Priority Data

Dec. 24, 2013   (EP) .................................. 13199564

(51) Int. Cl.
 G01C 3/08   (2006.01)
 H04N 13/02   (2006.01)
 (Continued)

(52) U.S. Cl.
 CPC ............. H04N 13/02 (2013.01); G01S 17/86 (2020.01); G01S 17/894 (2020.01);
 (Continued)

(58) Field of Classification Search
 CPC .... H04N 13/25; H04N 13/128; H04N 13/122; H04N 5/3415; H04N 13/257;
 (Continued)

(56) References Cited

U.S. PATENT DOCUMENTS 7,791,715 B1 *   9/2010   Bamji ...................... G01C 3/08
                                                                  356/5.1
7,994,465 B1 *   8/2011   Bamji ................... G01S 7/4914
                                                                  250/214 R
(Continued)

FOREIGN PATENT DOCUMENTS

CN   101094320 A   12/2007
CN   101321302 A   12/2008
(Continued)

OTHER PUBLICATIONS

Chinese Office Action and English Translation thereof for Chinese Application No. 2014800408199 dated Oct. 25, 2017.
(Continued)

*Primary Examiner* — Howard D Brown, Jr.
(74) *Attorney, Agent, or Firm* — Wolf, Greenfield & Sacks, P.C.

(57) ABSTRACT

The invention relates to a TOF camera system comprising several cameras, at least one of the cameras being a TOF camera, wherein the cameras are assembled on a common substrate and are imaging the same scene simultaneously and wherein at least two cameras are driven by different driving parameters.

12 Claims, 3 Drawing Sheets

Related U.S. Application Data continuation of application No. 16/460,049, filed on Jul. 2, 2019, now Pat. No. 10,638,118, which is a division of application No. 14/904,554, filed as application No. PCT/EP2014/079304 on Dec. 24, 2014, now Pat. No. 10,397,552.

(51) Int. Cl.
| | |
|---|---|
| *H04N 13/128* | (2018.01) |
| *H04N 13/243* | (2018.01) |
| *H04N 13/246* | (2018.01) |
| *H04N 13/257* | (2018.01) |
| *H04N 13/271* | (2018.01) |
| *H04N 13/122* | (2018.01) |
| *H04N 13/207* | (2018.01) |
| *G01S 17/86* | (2020.01) |
| *G01S 17/894* | (2020.01) |
| *H04N 25/40* | (2023.01) |
| *H04N 13/00* | (2018.01) |

(52) U.S. Cl.
CPC ......... *H04N 13/122* (2018.05); *H04N 13/128* (2018.05); *H04N 13/207* (2018.05); *H04N 13/243* (2018.05); *H04N 13/246* (2018.05); *H04N 13/257* (2018.05); *H04N 13/271* (2018.05); *H04N 25/41* (2023.01); *H04N 2013/0081* (2013.01)

(58) Field of Classification Search
CPC .. H04N 13/271; H04N 13/243; H04N 13/246; H04N 13/207; H04N 2013/0081; G01S 17/89; G01S 17/023
See application file for complete search history.

(56) References Cited

U.S. PATENT DOCUMENTS

| | | | |
|---|---|---|---|
| 10,397,552 B2 | 8/2019 | Van Nieuwenhove et al. | |
| 10,638,118 B2 | 4/2020 | Van Nieuwenhove et al. | |
| 2010/0322477 A1 | 12/2010 | Schmitt | |
| 2011/0025843 A1 | 2/2011 | Oggier | |
| 2011/0304841 A1* | 12/2011 | Bamji | G01S 7/4914 356/5.01 |
| 2012/0044093 A1 | 2/2012 | Pala | |
| 2012/0249744 A1 | 10/2012 | Pesach | |
| 2013/0188022 A1 | 7/2013 | Katz | |
| 2014/0028804 A1 | 1/2014 | Usuda et al. | |
| 2014/0049783 A1 | 2/2014 | Royo Royo | |
| 2014/0327741 A1 | 11/2014 | Fleischmann | |
| 2015/0075067 A1 | 3/2015 | Stowe | |
| 2016/0005179 A1 | 1/2016 | Petyushko | |
| 2016/0117829 A1 | 4/2016 | Yoon | |
| 2016/0295193 A1 | 10/2016 | Van Nieuwenhove et al. | |
| 2019/0291720 A1* | 9/2019 | Xiao | G05D 1/0221 |
| 2020/0007850 A1 | 1/2020 | Van Nieuwenhove et al. | |
| 2020/0236342 A1 | 7/2020 | Van Nieuwenhove et al. | |

FOREIGN PATENT DOCUMENTS

| | | |
|---|---|---|
| EP | 2026591 A2 | 2/2009 |
| JP | 2002-500367 A | 1/2002 |
| JP | 2008-008687 A | 1/2008 |
| JP | 2008-164367 A | 7/2008 |
| JP | 2008-286527 A | 11/2008 |
| JP | 2009-047497 A | 3/2009 |
| JP | 2009-139995 A | 6/2009 |
| JP | 2013-538342 A | 10/2013 |
| KR | 10-2012-0056668 | 6/2012 |
| WO | WO 99/34235 A1 | 7/1999 |
| WO | WO 2010/139628 A1 | 12/2010 |
| WO | WO 2012/012607 A2 | 1/2012 |
| WO | WO 2012/137434 A1 | 10/2012 |

OTHER PUBLICATIONS

European Communication for European Application No. 13199564.9 dated Jan. 13, 2017.
European Communication in connection with European Application No. 13199564.9, dated May 11, 2020.
Japanese Office Action and English Translation thereof for Japanese Application No. 2016-526665 dated Oct. 24, 2017.
Huhle et al., On-the-Fly Scene Acquisition with a Handy Multisensor-System. Int. J. of Intelligent Systems Technologies and Applications. Jan. 1, 2007. pp. 1-9, XP055115315.
CN 2014800408199, Oct. 25, 2017, Office Action.
EP 13199564.9, Jan. 13, 2017, European Communication.
EP 13199564.9, May 11, 2020, European Communication.
JP 2016-526665, Oct. 24, 2019, Office Action.

\* cited by examiner

TIME-OF-FLIGHT CAMERA SYSTEM

CROSS REFERENCE TO RELATED APPLICATIONS

The present application claims the benefit under 35 U.S.C. § 120 as a continuation application of U.S. application Ser. No. 16/843,346, filed on Apr. 8, 2020, now U.S. Pat. No. 11,172,186, which is a continuation application of U.S. application Ser. No. 16/460,049, filed on Jul. 2, 2019, now U.S. Pat. No. 10,638,118, which is a division of U.S. patent application Ser. No. 14/904,554, filed on Jan. 12, 2016, now U.S. Pat. No. 10,397,552, which claims the benefit under 35 U.S.C. § 371 as a U.S. National Stage Entry of International Application No. PCT/EP2014/079304, filed in the European Patent Office as a Receiving Office on Dec. 24, 2014, which claims priority to European Patent Application No. 13199564.9, filed in the European Patent Office on Dec. 24, 2013, each of which is hereby incorporated by reference in its entirety.

FIELD OF THE INVENTION

The present invention relates to Time-Of-Flight (TOF) range imaging systems, namely TOF camera systems. In particular, the aim of the present invention is to provide a 3D image of a scene of high quality.

BACKGROUND OF THE INVENTION

Computer vision is a growing research field that includes methods for acquiring, processing, analysing, and understanding images. The main driving idea in that field is to duplicate the abilities of the human vision system by electronically perceiving and understanding images of a scene. Notably, one theme of research in computer vision is the depth perception or, in other words, the three-dimensional (3D) vision.

For human beings, the depth perception is originated from the so-called stereoscopic effect by which the human brain fuses two slightly different images of a scene captured by the two eyes, and retrieves, among others, depth information. Moreover, recent studies have shown that the capacity to recognize objects in a scene greatly further contributes to the depth perception.

For camera systems, the depth information is not easily obtained and requires complex methods and systems. When imaging a scene, one conventional two-dimensional (2D) camera system associates each point of the scene with a given RGB colour information. At the end of the imaging process, a 2D colour map of the scene is created. A standard 2D camera system cannot recognize objects in a scene easily from that colour map as colour is highly dependent on varying scene illumination and as it does not intrinsically contain any dimensional information. New technologies have been introduced for developing computer vision and notably for developing 3D imaging, enabling in particular the direct capture of depth related information and the indirect acquisition of scene or object related dimensional information. The recent advancements in 3D imaging systems are impressive and have led to a growing interest from industry, academy and consumer society.

The most common technologies used to create 3D images are based on the stereoscopic effect. Two cameras take pictures of the same scene, but they are separated by a distance—exactly like the human eyes. A computer compares the images while shifting the two images together over top of each other to find the parts that match and those that mismatch. The shifted amount is called the disparity. The disparity at which objects in the image best match is used by the computer to calculate distance information, namely a depthmap, by using additionally camera sensors geometrical parameters and lens specifications.

Another more recent and different technology is represented by the Time-Of-Flight (TOF) camera system 3 illustrated in FIG. 1. TOF camera system 3 includes a camera 1 with a dedicated illumination unit 18 and data processing means 4. TOF camera systems capable of capturing 3D images of a scene 15 by analysing the time of flight of light from a light source 18 to an object. Such 3D camera systems are now used in many applications where depth or distance information measurement is required. Standard 2D camera systems, such as Red-Green-Blue (RGB) camera systems, are passive technologies, i.e. they use the ambient light to capture images and are not based on the emission of an additional light. On the contrary, the basic operational principle of a TOF camera system is to actively illuminate a scene 15 with a modulated light 16 at a predetermined wavelength using the dedicated illumination unit, for instance with some light pulses of at least one predetermined frequency. The modulated light is reflected back from objects within the scene. A lens collects the reflected light 17 and forms an image of the objects onto an imaging sensor 1. Depending on the distance of objects from the camera, a delay is experienced between the emission of the modulated light, e.g. the so called light pulses, and the reception at the camera of those light pulses. In one common embodiment, distance in between reflecting objects and the camera may be determined as function of the time delay observed and the speed of light constant value. In one another more complex and reliable embodiment, a plurality of phase difference in between the emitted reference light pulses and the captured light pulses may be determined and used for estimating depth information as introduced in Robert Lange phd thesis entitled "3D time-of-flight distance measurement with custom solid-state image sensors in CMOS/CCD technology".

A TOF camera system comprises several elements, each of them having a distinct function.

1) A first component of a TOF camera system is the illumination unit 18. When using pulses, the pulse width of each light pulse determines the camera range. For instance, for a pulse width of 50 ns, the range is limited to 7.5 m. As a consequence, the illumination of the scene becomes critical to the operation of a TOF camera system, and the high speed driving frequency requirements for illumination units necessitate the use of specialised light sources such as light emitting diodes (LEDs) or lasers to generate such short light pulses.

2) Another component of a TOF camera system is the imaging sensor 1 or TOF sensor. The imaging sensor typically comprises a matrix array of pixels forming an image of the scene. By pixel, it should be understood the picture element sensitive to light electromagnetic radiations as well as its associated electronic circuitry. The output of the pixels can be used to determine the time of flight of light from the illumination unit to an object in the scene and reflected back from the object to the imaging TOF sensor. The time of flight can be calculated in a separate processing unit which may be coupled to the TOF sensor or may directly be integrated into the TOF sensor itself. Various methods are known for measuring the timing of the light as it travels from the illumination unit to the object and from the object back to the imaging sensor.

3) Imaging optics 2 and processing electronics 4 are also provided within a TOF camera system. The imaging optics are designed to gather the reflected light from objects in the scene, usually in the IR domain, and filter out light that is not in the same wavelength than the light emitted by the illumination unit. In some embodiments, the optics may enable the capture of infra-red illumination for TOF principle measurements and visible illumination for RGB colour measurements. The processing electronics drives the TOF sensor so as to, among several features, filter out light of frequencies different from the ones emitted by the illumination unit but having a similar wavelength (typically the sunlight). By filtering out unwanted wavelengths or frequencies, background light can effectively be suppressed. The processing electronics further include drivers for both the illumination unit and the imaging sensor so that these components can accurately be controlled in synchrony to ensure that an accurate image capture is performed and that a reliable depth-map of the scene is determined.

The choice of elements constituting a TOF camera system is crucial. TOF camera systems tend to cover wide ranges from a few millimetres up to several kilometres depending on the type and on the performances of the elements used. Such TOF camera systems may have distance accuracy varying from the sub-centimetres to several centimetres or even metres. Technologies that can be used with TOF camera systems include pulsed light sources with digital time counters, radio frequency (RF) modulated light sources with phase detectors, and range-gated imagers.

TOF camera systems suffer from several drawbacks. In current TOF imagers or TOF sensors, pixel pitches are usually ranging from 10 µm to 100 µm. Due to the novelty of the technology and to the fact that the architecture of a TOF pixel is highly complex, it is difficult to design a small pixel size while maintaining an efficient signal to noise ratio (SNR) and keeping in mind the requirement related to mass production at low cost. This results in relatively big chip sizes for TOF image sensor. With conventional optics, such big sizes of image sensor require large and thick optical stacks to fit onto the die. Generally, a compromise has to be found between required resolution and the thickness of the device to make it be embeddable on portable mass consumer product.

Furthermore, the depth measurement obtained by a TOF camera system may be erroneously determined for several reasons. Firstly, the resolution of such systems is to be improved. Big pixel size requires big sensor chip and thus the sensor resolution is limited by the TOF sensor size. Secondly, the accuracy in depth measurement of such systems still needs to be improved as, among a plurality of parameters, it is highly dependent on the Signal to Noise ratio and on the modulation frequency (the modulation frequency determining the depth accuracy and the operating depth measurement range). In particular, the uncertainty or inaccuracy in depth measurement may be due to an effect called "depth aliasing" which will be described in details later. Moreover, uncertainty can originate from the presence of additional light in the background. Indeed, the pixels of TOF camera systems comprise a photosensitive element which receives incident light and converts it into an electrical signal, for example, a current signal. During the capture of a scene, if the background light is too intense in the wavelength the sensor is sensitive to, then pixels may receive additional light not reflected from objects within the scene, which may alter the measured distance.

At present, in the field of TOF imaging, several options are available to overcome at least partially the major individual drawbacks the technology may suffer from, such as for instance, improved modulation frequency systems enabling more robust and accurate depth measurement, dealiasing or background light robustness mechanisms.

A solution remains to be proposed in to address these drawbacks together and to additionally improve the resolution of the TOF camera systems while limiting the thickness of the complete system and reducing parallax issues to make it compliant with mass-produced portable devices integration.

SUMMARY OF THE INVENTION

The present invention relates to a TOF camera system comprising several cameras, at least one of the cameras being a TOF camera, wherein the cameras are assembled on a common substrate and are imaging the same scene simultaneously and wherein at least two cameras are driven by different driving parameters.

Using the at least one TOF camera depth information combined with at least the information from another camera driven with different parameters, the fusion of all the camera information together helps in refining and enhancing the quality of the resulting image, and in particular helps in obtaining a higher quality depthmap from the captured scene, since the images are acquired simultaneously by the cameras.

Advantageously, the sensors of the cameras are manufactured and assembled on a common substrate, such as for instance a silicon based substrate or a wafer, which reduces the thickness and the size of the TOF camera system. This common substrate enables also to reduce parallax issues resulting from the use of several cameras.

Preferably, the TOF camera system also further comprises an array of several lenses, each lens of the array being associated to each of the cameras. These lenses help focusing the impinging light on photosensitive area of their respective associated camera sensor.

Advantageously, the driving parameters comprise parameters for implementing a stereoscopic technique and/or for implementing a dealiasing algorithm and/or for implementing a background light robustness mechanism. Dealiasing shall be explained herein below.

More advantageously, at least two cameras of the TOF camera system may image the same scene during different integration times.

More advantageously, the TOF camera system may comprises two TOF cameras having each a TOF sensor imaging the same scene and being driven for determining distance information from different modulation frequencies.

More preferably, the TOF camera system further may comprise means for filtering the light in the visible range and/or in the InfraRed. The use of such means for filtering the light enables the tuning of the light in order to choose wavelength in the range of which each sensor have to be sensitive to.

The present invention shall be better understood upon reading the following description, in light of the attached drawings.

DESCRIPTION OF THE INVENTION

Figure 1:
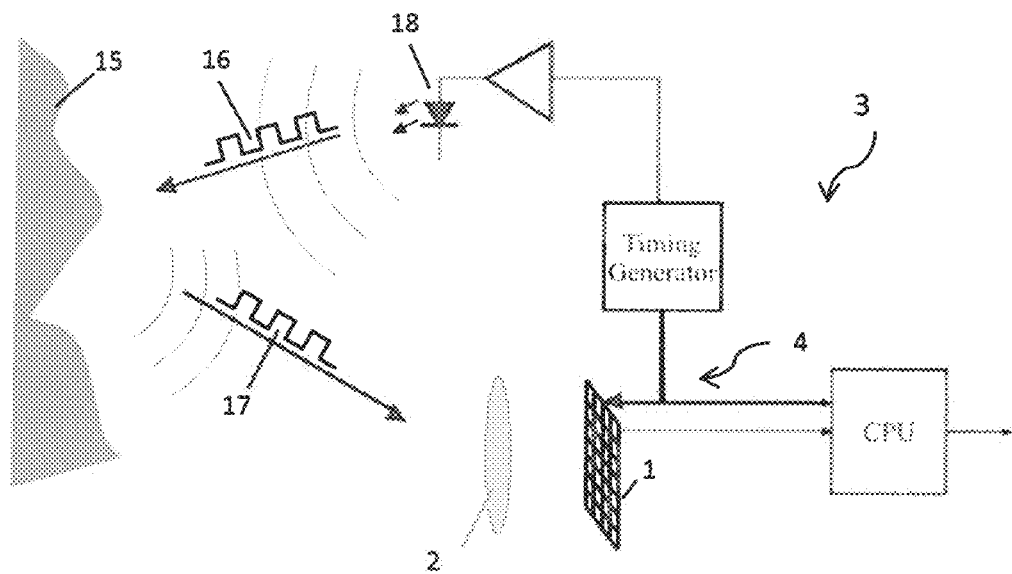
FIG. 1 illustrates basic operational principle of a TOF camera system.

The present invention will be described with respect to particular embodiments and with reference to certain drawings but the invention is not limited thereto. The drawings are only schematic and are non-limiting. In the drawings, the size of some of the elements may be exaggerated and not drawn on scale for illustrative purposes.

As illustrated by FIG. 1, a conventional TOF camera system comprises one TOF sensor 1 and its associated optical means 2 (e.g. a lens), an illumination unit 18 for illuminating the scene 15 with respect to the TOF principle specifications, and an electronic circuitry 4 for at least driving the illumination unit and the TOF sensor. The light is usually in the infra-red wavelength domain and comprises periodically modulated pulses 16 emitted toward the scene. The TOF sensor and its associated optical means are designed to enable the capture of the emitted modulated light that is reflected back from the scene. One option for determining distance information in-between the scene objects and the so formed TOF camera system is to determine the phase delay between the emitted pulsed or modulated light and the light received back at the TOF sensor.

In order to improve the quality and resolution of a Time-Of-Flight image, namely the depthmap, and to reduce the thickness of TOF camera system, the present invention relates to a novel TOF camera system comprising several cameras, at least one of the cameras being a TOF camera, wherein the cameras are assembled on a common support and are imaging the same scene and wherein at least two cameras are driven by different driving parameters.

By camera, it is meant an electronic device system comprising at least the means for capturing the electromagnetic radiation of an impinging light. For instance, a camera may be represented at least by one single pixel of a sensor device. A camera may also be represented by a group of pixels on a sensor device or by an entire sensor device. Preferably, the sensor device from which at least one camera is determined comprises a matrix array of pixels and the circuitry for operating them. The circuitry may further comprises electronic means for further processing the data measured by each pixel and/or each camera from the at least one sensor device used. The invention may also relate more generally to a TOF camera system comprising a plurality of independent camera having each at least one sensor device, and among which at least one comprises a TOF sensor device.

The invention will be now explained with respect to a symmetric configuration of a 4-cameras array. It is worth noticing at this point that aspects of the present invention are neither limited to four cameras associated each with at least one lens, nor to the symmetry shown in the used examples. A person skilled in the art could easily extrapolate the described principles to less, or to more lenses and cameras, for instance two lenses associated to at least one sensor onto which two cameras are defined, and/or differently configured viewpoints.

When designing a TOF camera system comprising several cameras, at least one of the cameras being a TOF camera, several configurations are possible to arrange the cameras.

Figure 2:
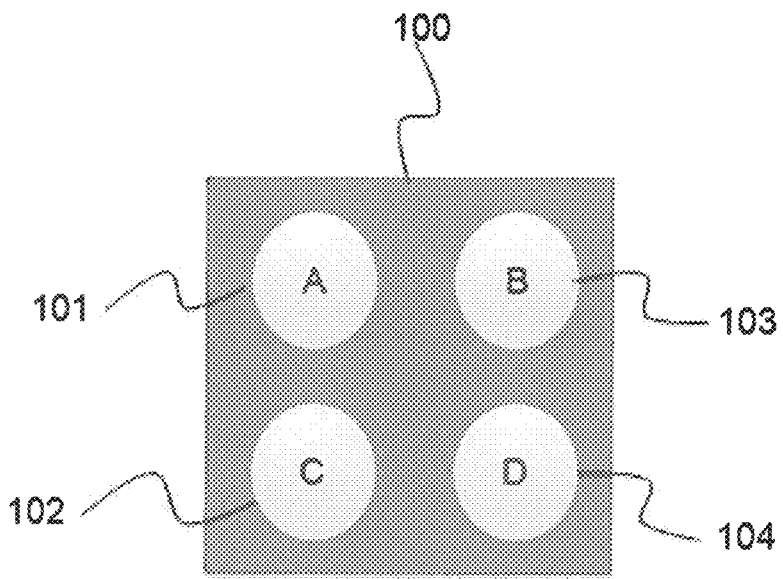
FIG. 2 illustrates a multi-lens TOF sensor stack.

In FIG. 2, a first configuration is shown with 4 lenses A, B, C, D (101-104) on top of a support, an image sensor plane 100. Each lens enables the impinging light coming from the imaged scene to be focused on each individual camera of the image sensor plane. For instance, in one embodiment each lens focuses the captured light on each camera defined on a TOF image sensor. The fusion of the four individual images may offer a higher resolution image with a lower thickness than a larger high resolution single camera TOF sensor system.

Figure 3:
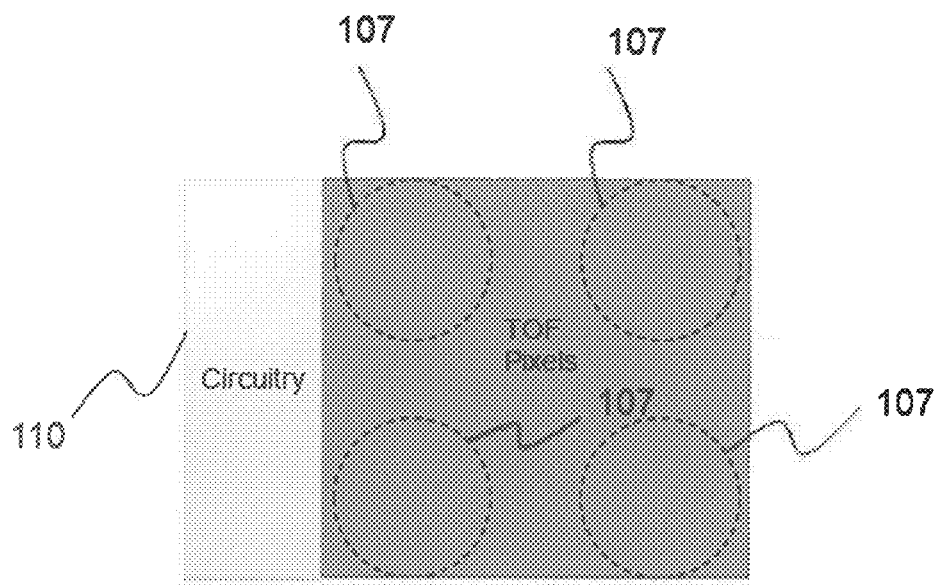
FIG. 3 illustrates a standard TOF sensor used in a stack such as illustrated in FIG. 2.
Figure 4:
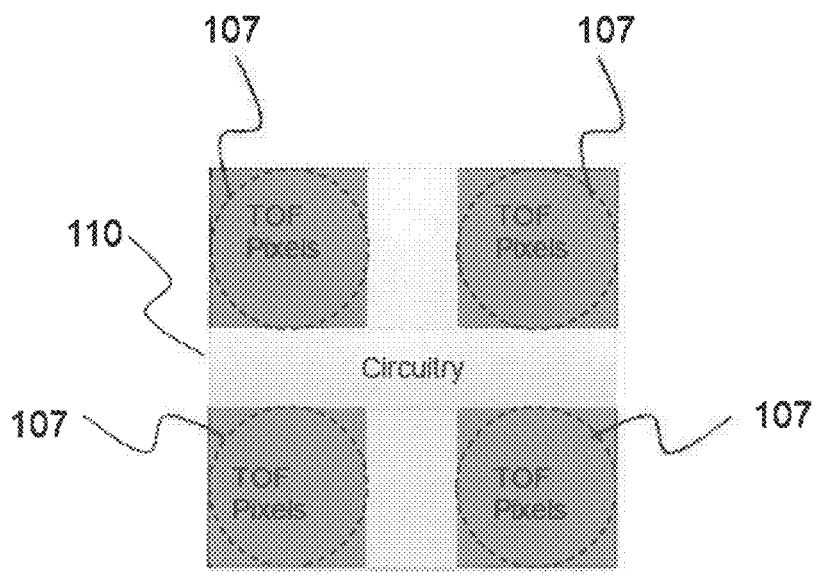
FIG. 4 illustrates a custom optimized TOF sensor for a stack such as illustrated in FIG. 2.
Figure 5:
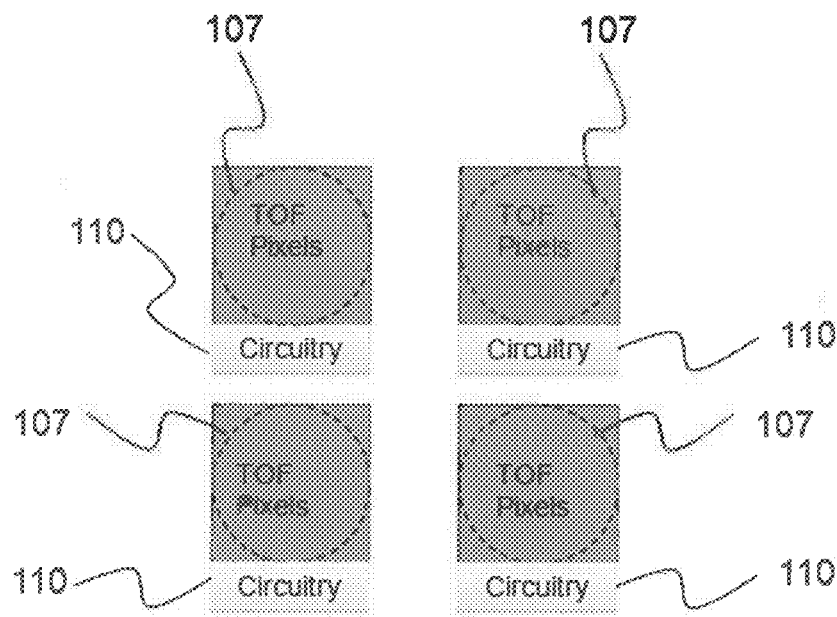
FIG. 5 illustrates a stack, such as illustrated in FIG. 2, using 4 separate TOF sensors.

In FIG. 3 to FIG. 5, a support, i.e. an image sensor plane 100, four cameras 107 and their associated circuitry 110 are shown. Several possible configurations of the image sensor circuitry within the support are displayed.

1) The first configuration, illustrated in FIG. 3, is the most straightforward. One single TOF image sensor device is used; it covers the four image areas 107 (i.e. the cameras) constructed or delimited by the four lenses 101-104. The image sensor circuitry 110, comprising various analog and/or digital blocks (signal conditioning, Analog-to-Digital Conversion, filtering, image sensor processing . . . ), is in this case shown on the side of the image sensor and all the TOF pixels are grouped. An advantage of this approach is that existing TOF image sensors devices can be used for this principle. One disadvantage of this approach is that a lot of TOF pixels in-between the regions 107 are not in the image plane of the optics 101-104 and are by the way useless. Another disadvantage of this approach is that such a system will suffer from a limited resolution since an efficient TOF sensor device is natively limited in resolution for a given size. Another disadvantage of this approach is that it provides only TOF principle based information from the scene i.e. a depthmap and an illumination or confidence greyscale map.

2) A second possible configuration is shown in FIG. 4, where several cameras are assembled on a common support (e.g. designed on the same silicon substrate). In this configuration, each camera is also covered by its own lens. Only cameras located in the regions delimitated by optics are generating the images. This way, the image sensor circuitry can be allocated in the free space between the regions 107. In FIG. 4, the free space between the regions 107 can be seen as rectangular strips, forming a "cross", and wherein the electronic circuitry for operating the cameras can be set so as to save silicon and minimize the size of the so formed sensor system. As shown in FIG. 4, the image sensor system obtained is smaller in size than the image sensor system from FIG. 2. This second configuration optimizes cost and board space. It is to be noted that obviously, the electronic circuitry filling the free substrate space available in between the cameras may be designed in other less optimal forms than a cross, for instance in the form of a stripe.

3) A third possible configuration is shown in FIG. 5, where four cameras (formed by four individual TOF image sensors) are positioned under the four lenses 101-104 of FIG. 2 and form one single support together. In this configuration, each TOF sensor is covered by its own lens, and is governed by its own circuitry. With this approach, four individual camera calibrations and mounting alignment steps are required.

According to a first embodiment of the present invention, the TOF camera system comprises several cameras, at least one of the cameras being a TOF camera, wherein the cameras are assembled on a common substrate and are imaging the same scene simultaneously and wherein at least two cameras are driven by different driving parameters.

By common substrate, it should be understood that the cameras are manufactured on a common base, i.e. an underlying material providing a surface on which the cameras can directly be manufactured, for instance a wafer such as the ones commonly used in the field of microelectronics. This substrate can be silicon based for instance and the plurality of cameras can be made from this silicon.

The fact that the cameras are imaging the same scene simultaneously means that the cameras are exposed to the light coming from the scene at the same time, and not sequentially, in order to obtain an improved measurement demonstrating for instance no motion related artefacts from one camera capture with some determined parameters to the at least other one camera capture determined with some other parameters.

The TOF camera system may be designed according to the configurations exposed above. Preferably, the TOF camera system may be designed according to the configuration displayed in FIG. 4 wherein the cameras are assembled on a common substrate. This substrate may be silicon-based, but the present invention is not limited thereto.

The facts that the cameras are assembled on a common substrate and are imaging the same scene and that at least two cameras are driven by different driving parameters simultaneously enable in particular to obtain different types of information from the same scene simultaneously, this information being for example at least one of colour, illumination or depthmap information. Preferably, this information may be several depthmaps of a determined resolution and optionally a colour image of preferably a higher resolution.

The fusion of the different information contained in each single image, namely the fusion of at least one depthmap obtained according to the TOF principle with at least another image containing at least depth information or colour information, enables the computation of one single resulting image with improved quality. By "fusion", it should be understood the combination of information related to individual images to generate the improved and/or refined resulting image or "super-image" demonstrating at least a higher quality depth measurement for each single pixel or a higher resolution.

By using this TOF camera system, it is possible to fuse individual images to one "super-image", for instance to fuse 4 individual images. In one preferred embodiment, both the resolution and the depthmap accuracy information of the so-called "super-image" resulting from the fusion are improved compared to the individual information generated from each of the single individual images.

In one embodiment, at least one of the lenses of the lens array or at least one of the cameras of the TOF system may be different from the others in that, the lens may deliver an image with a different focal length, and the cameras may be of a different size and/or a different resolution. For instance, a TOF camera system comprising two TOF cameras and two colour camera may have colour cameras (respectively colour sensors) different in size and resolution from the TOF cameras (respectively TOF sensors). The lens associated with the TOF camera may further be of a different focal length than those associated with the colour cameras. The scene observed by the TOF cameras and the colour cameras being the same, the parameters associated to each kind of cameras, namely the resolution, the lens focal length, the sensor sizes, may lead to different images captured by each kind of camera. For instance a depthmap estimated by stereovision principle from the colour images may represent a slightly different view of the scene imaged by the depthmap obtained by at least one TOF camera.

The driving parameters that may be implemented in the TOF camera system are presented herein below, but are not limited thereto.

In one embodiment, at least two of the cameras may be driven by parameters for implementing a stereoscopic technique. Stereoscopy refers to a technique for creating or enhancing the illusion of depth in an image, by means of binocular vision. In this technique, binocular vision of a scene creates two slightly different images of the scene in the two eyes, due to the different positions of eyes on the head. These differences provide information that the brain can use to calculate depth in the visual scene, providing a depth perception. In one embodiment, a passive stereoscopic calculation may be used next to the time-of-flight depth calculation, based on the combinations of at least two viewpoints of the present invention. This calculation may be very coarse, to identify or resolve dealiasing. Preferably, the furthest apart regions 107 i.e. the furthest cameras may be used. Further preferably, in the case of four pixels, the diagonal regions may be used to implement those driving parameters.

In one derived embodiment, at least two colour cameras of same resolution may be used for providing input to the stereoscopic principle based depth measurement with which the depthmap originated from the at least one TOF camera may be fused.

In another derived embodiment of the present invention using stereoscopic technique, at least two TOF cameras are driven each with different parameters for providing two depthmaps of the same scene with different intrinsic measurement quality. Those depthmaps are fused together for providing a higher quality depthmap than anyone of the two original individual depthmaps. The TOF camera system may further use the two individual IR illumination or confidence maps natively provided by the two TOF cameras so has to implement a stereoscopic technique generating a depthmap from stereo which may be used for fusing and refining at least one of the two depthmaps from the TOF cameras, or the depthmap generated by their fusion. Such an embodiment may particularly be relevant for obtaining, for instance, extra distance measurement range that the predetermined light pulse frequencies or the illumination power do not allow to obtain.

In one particular embodiment wherein at least one of the sensors is a TOF sensor for being operated with respect to the TOF principle, at least two other sensors may be RGB sensors operated with different parameters, having a higher resolution and being used for determining a depthmap from stereovision principle. This stereovision based high resolution depthmap may be used for fusion with the lower resolution depthmap obtained from the TOF principle on the at least one TOF sensor. Stereovision based depthmap suffering from holes and lowest depth estimation than a TOF principle depth measurement, the depthmap obtained at the TOF camera may be used to refine the higher resolution but uncompleted depthmap obtained by stereovision principle. Preferably the fusion may be operated within the circuitry of the TOF camera system, and the resulting improved depthmap may also comprise colour information originated from the stereovision capture. This improved resulting image being of a resolution at least similar to the one of the highly resolved sensor, but may also be of a lower or higher resolution using interpolation computation means from state of the art.

According to another embodiment, another driving parameter that may be implemented on the cameras of the TOF camera system, and in particular on the TOF cameras of the TOF camera system, is the use of different frequencies applied to the emitted pulsed illumination and their synchronized captures when impinging back from the scene onto each individual TOF camera. This particular embodiment for driving differently the cameras is intended to apply depth measurement dealiasinq principle on the TOF measurements. In signal processing and related disciplines, aliasing refers to an effect that causes different signals to become indistinguishable when sampled. Temporal aliasing is when the samples become indistinguishable in time. Temporal aliasing can occur when the signal being sampled periodically also has periodic content. In TOF principle operated systems, at a given modulation frequency, depth aliasing results in ambiguity concerning the distance to be recorded as same distance may be measured for object being at different distances from the TOF camera system that have a predetermined operating range. For instance, a TOF camera system operated with a single modulation frequency having an operating range from one meter to five meters, makes any object at six meter from the camera system being measured as being at one meter (periodic behavior), if reflecting back enough the modulated light onto the camera.

In one embodiment, at least one of the TOF cameras of the TOF camera system may be driven by such a dealiasing principle and more particularly by the related dealiasing algorithm or method. This at least one TOF camera may be operated and driven for measuring distance information according to the TOF principle using at least two different frequencies and the distance measurement obtained by this TOF camera may be dealiased according to the dealiazing principle. The distance measurements, in the form of a depthmap, may then be fused with measured information from the other cameras of the TOF camera system, said other cameras being driven with different parameters. For instance, the other information may be at least one of a higher or a lower resolution depthmap originated from stereovision principle or from TOF principle, and/or a colour image.

In a further preferred embodiment, different dealiasing techniques may be implemented for the different cameras, i.e. the regions 107, yielding even more robust dealiasing advantages as each camera provides different dealiased depth measurements. Another example is a TOF camera system comprising at least two TOF cameras operated with different parameters, said different parameters being the modulation frequency to which their respective capture is synchronized to. At least two different frequencies can be used to drive the TOF cameras. The modulated illuminating light may comprise at least two predetermined frequencies, one reference frequency and a further frequency being for instance three times lower than the reference frequency. One first TOF camera of the TOF camera system may be driven in synchrony with the three times lower modulation frequency while the other TOF camera of the TOF camera system may be driven in synchrony with the reference frequency. This way, the two TOF cameras of the TOF camera system may acquire within the same time depth aliased measurements with different unambiguous distance range, those depth measurements may further be combined for providing one single dealiased depthmap. This principle can be repeated if needed, hence yielding a very high unambiguous distance to the complete TOF camera system In one derived embodiment comprising at least one TOF camera operated according to the TOF principle, the dealiazed depthmap so generated may further be fused with other measurements from at least one other camera, said other measurement being at least one of another same resolution depthmap originated from TOF principle or stereovision principle, a same resolution colour map, a higher resolution depthmap originated from TOF principle or stereovision principle, a higher resolution resolution colour map.

It is to be noted that when using a plurality of frequencies, i.e. at least two, for operating dealiazing principle on TOF based depth measurements, the higher the second frequency, the higher the accuracy of that second depth measurement. By the way, if a TOF camera system comprising at least one TOF camera is operated according to the dealiazing principle, and preferably if two TOF camera are being operated each with at least one frequency, then the fusion of the depth measurements may lead to a more accurate depthmap. If additionally at least one of the cameras operated with another driving parameter is of higher resolution, the resulting image will comprise higher resolution, higher accuracy, and dealiased depth measurements. Even more preferably, the camera system may further comprise means for capturing color information, those means being characterized in that at least one of the cameras captures colour information. Even more preferably, at least one of the cameras of the TOF camera system is a RGBZ camera such as a RGBZ sensor. The TOF camera system can thus comprise at least three cameras, at least two of the cameras being TOF cameras, the at least two TOF cameras being driven by different driving parameters, such as, but not limited to frequencies, while imaging simultaneously the same scene.

In one further embodiment, different background light robustness mechanisms may be implemented on the cameras. Quite often, by improving background light robustness, noise or pixel pitch can be increased. The use of background light robustness mechanisms on different regions 107 i.e. on cameras may confer strong advantages. In one embodiment, at least one of the cameras of the system may be driven by a background light robustness mechanism. This can have advantages for applications where only the resolution of one region 107 is needed in case of high background light.

In one further embodiment, at least two cameras of the TOF camera system may be driven with two different integration times. Indeed, a very short integration time yields high motion robustness, but also high standard deviations on the depth values, referred to in this document as depth noise. Therefore, a region 107 may be optimized for short integration time while another region 107 may be optimized for noise performance. When fusing the images and more particularly their associated information, the advantages of both configurations may be obtained and used. Advantageously, this embodiment enables each fused pixel to get reliable information about fast moving objects thanks to the TOF camera driven by a short integration time, while inheriting low noise information from the others cameras driven by longer integration times. In a derived embodiment, the other cameras may comprise at least one another TOF camera driven with a longer integration time. In one another embodiment, the other cameras may comprise at least another TOF camera driven with a longer integration time and at least one colour camera.

In order to proceed with a reliable fusion of the different information, process is to be implemented, in the circuitry, or in a companion chip, or onto a separated processing unit so as to transform the different sets of information associated each with a coordinate system into one single set of data having a single common predetermined coordinate system. Preferably, the common predetermined coordinate system will be the x-y plan (e.g. the plan defined by horizontal and vertical axis) of one of the cameras, for instance the x-y plan of the highly resolved camera. The data from the other camera, for instance the colour images, the depthmap measurements or the greyscale image of a TOF confidence map, are projected using the registration into an image associated with the common predetermined coordinate system. In particular, image registration here involves spatially registering a target image, for instance a low resolution highly accurate depthmap obtained form a TOF measurement to align with a reference image, for instance a high resolution low accuracy depthmap obtained from stereovision and comprising colour information. Several methods of images registration may be used such as intensity-based or feature-based methods. Intensity-based methods may in particular compare intensity patterns in images via a correlation metrics, while feature-based methods mostly tries to find a matching or correspondence between image features such as points, lines, contours and depth. Intensity-based methods aim at registering entire images or sub-images. If sub-images are registered, centres of corresponding sub-images are treated as corresponding feature points. Feature-based methods establish a correspondence between a predetermined number of distinctive points in images. Knowing the correspondence between a number of points in images, a transformation is then determined to map the target image to the reference images, thereby establishing point-by-point correspondence between the reference and target images. This later registration process may further include interpolation technics as images may be of different resolution.

In one preferred embodiment of the invention using image registration when multiple TOF cameras are used, or at least when the TOF camera system comprises at least one camera providing depth information, the depth information may be used to facilitate the fusion of the images. Depth is a unique characteristic of a scene, in first order independent of angle of viewpoint and/or light conditions. Therefore this is a very stable metric for performing any alignment, any pattern recognition or any other means needed in fusing the images.

In one preferred embodiment, at least one of the cameras could be calibrated more thoroughly, allowing the other cameras to inherit from this calibration. In Time-of-Flight imaging, thorough calibration steps are required, such as absolute distance calibration, temperature, deformations, multi-path resolving and more. Calibrating only one camera saves time due to the fewer pixels and higher mathematics that can be applied to compute the calibration, the other cameras can then benefit and inherit the calibrated viewpoint to correct for distance errors and/or non-linearities. This calibration may be performed at production time, but may also be executed at run-time, by for instance in one of the above mentioned TOF camera system comprising four TOF cameras, dimensioning at least one of the four viewpoints/cameras to be a much more stable imager, so that it is used as the reference for calibrating.

Figure 6:
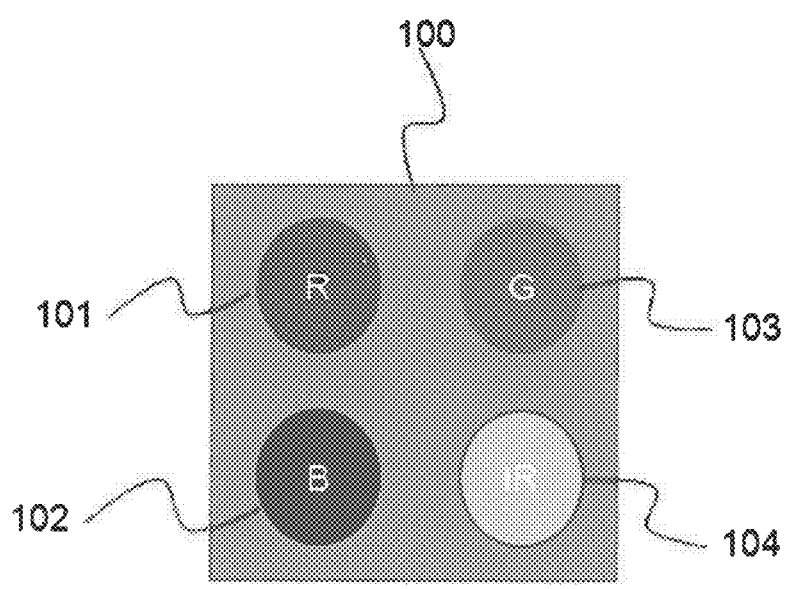
FIG. 6 illustrates a multi-lens TOF sensor stack, also using colour and infrared filters.

According to a further embodiment of the invention, the TOF camera system may further comprise means for filtering the light in the visible range and/or in the InfraRed. Colour filters may be implemented on top of cameras, as shown in FIG. 6. In this Figure, R, G, B and IR areas stand for Red, Green, Blue and InfraRed pass filters, respectively. This allows combining both RGB and depth data in one image, allowing for a fused or improved image combining all these properties. However, a TOF camera system comprising at least one TOF camera, and at least one another camera driven with different parameter may be characterized in that at least one of the cameras is a RGBZ camera. A RGBZ camera is a camera comprising several pixels characterized in that the sensing areas of said pixels collect at least one colour among the Red, the Green, the Blue, preferably the three RGB colours, and additionally capture Infra-Red illumination from which a depth (Z) information may be processed with respect to, for instance, the TOF principle.

In another further embodiment, the pixels of at least one camera of the TOF camera system may further comprise a Quantum Dots films. Quantum Dots are nanoparticles of semiconductor materials, with a diameter range from 2 to 10 nm. Quantum dots demonstrate unique optical and electrical properties due to their small size; i.e. their properties are different in character to those of the corresponding bulk material. The main apparent property is the emission of photons under excitation (fluorescence), which may be visible to the human eye as light or invisible if emitting in the Infra-Red domain. The wavelength of the emitted photons depends not only on the material from which the quantum dot is made, but also on the size of the Quantum Dot. The ability to precisely control the size of a Quantum Dot enables the manufacturer to determine the wavelength of the emission, i.e. to determine the wavelength of light output. Quantum dots can therefore be "tuned" during production to emit any wavelength desired. The ability to control, or "tune" the emission from the quantum dot by changing its core size is called the "size quantisation effect". The smaller the dot, the closer it is to the blue end of the spectrum, and the larger the dot, the closer to the red end. Quantum Dots can even be tuned beyond visible light, into the infra-red or into the ultra-violet, by using some specific materials.

Used as colour filters, the Quantum Dot films may be designed for re-emitting wavelength in the range for which the sensor is more sensitive. Preferably, the emitting wavelength of Quantum Dot films may be close to the maximum of sensitivity of the sensor enabling a measurement of lower noise.

The invention claimed is:

1. A sensor system comprising:
a plurality of sensors, at least one of the plurality of sensors, a first sensor, being a time-of-flight (TOF) sensor configured to obtain depthmap information of a scene, and a second sensor being configured to obtain image information of the scene, wherein the first sensor and the second sensor are disposed on a common substrate; and
circuitry configured to generate a first image by performing fusion on the depthmap information and the image information of the scene, the first image having a higher quality depth measurement for each single pixel or a higher resolution than the depthmap information and the image information.

2. The sensor system according to claim 1, wherein a driving parameter of the TOF sensor comprises at least two different modulation frequencies for implementing a dealiasing algorithm, and wherein the dealiasing algorithm includes instructions to distinguish between two potential distance measurements generated by the TOF sensor.

3. The sensor system according to claim 1, wherein the second sensor includes color filters corresponding to red, R, green, G, and blue, B, colors, and the TOF sensor further includes an infrared (IR) filter.

4. The sensor system according to claim 1, wherein a resolution of the image information obtained by the second sensor is higher than a resolution of the depthmap information obtained by the TOF sensor.

5. The sensor system according to claim 1, further comprising:
- a red, green, and blue (RGB) color filter on the second sensor, wherein the image information comprises RGB information of the scene;
- an infrared (IR) pass filter on the TOF sensor, wherein the depthmap further comprises IR data of the scene, and the circuitry is configured to generate the first image by performing the fusion of the IR data and the depthmap information with the image information of the scene.

6. A method of obtaining an image based on information from a plurality of sensors, at least one of the plurality of sensors being a Time-Of-Flight (TOF) sensor, disposed on a common substrate, the method comprising:
- obtaining depthmap information of a scene using the TOF sensor;
- obtaining image information of the scene using a second sensor among the plurality of sensors;
- generating the image by performing a fusion of the depthmap information and the image information of the scene, the image having a higher quality depth measurement for each single pixel or a higher resolution than the depthmap information and the image information.

7. The method according to claim 6, further comprising:
implementing a dealiasing algorithm using first driving parameters and second driving parameters, the first driving parameters and the second driving parameters comprising at least two different modulation frequencies, wherein implementing the dealiasing algorithm comprises distinguishing between two potential distance measurements generated by the TOF sensor.

8. The method according to claim 6, wherein the second sensor includes color filters corresponding to red, green, and blue colors, and the TOF sensor further includes an infrared (IR) filter.

9. The method according to claim 6, wherein obtaining the depthmap information of the scene using the TOF sensor comprises detecting a distance within the scene to an object with a resolution of distance information, and obtaining the image information of the scene using the second sensor comprises capturing an image of the object with a resolution of the image information, wherein the resolution of the image information is higher than the resolution of the distance information.

10. A sensor system comprising:
- a plurality of pixels including red, green, and blue (RGB) pixels configured to receive light filtered by RGB filters, wherein the RGB pixels are configured to obtain RGB data of a scene, and an infrared (IR) pixel configured to receive light filtered by an IR filter, wherein the IR pixel is configured to obtain depth data of the scene, and the RGB pixels and the IR pixel are disposed on a common substrate; and
- circuitry configured to generate a first image by performing a fusion of the depth data and the RGB data of the scene.

11. The sensor system according to claim 10, wherein a driving parameter of the IR pixel comprises at least two different modulation frequencies for implementing a dealiasing algorithm, and wherein the dealiasing algorithm includes instructions to distinguish between two distance measurements generated by the IR pixel.

12. The sensor system according to claim 10, a resolution of the RGB data obtained by the RGB pixels is higher than a resolution of the depth data obtained by the IR pixel.

* * * * *